Patented Jan. 9, 1940

2,186,044

UNITED STATES PATENT OFFICE 2,186,044

MANUFACTURE OF PRESERVES

William A. Rooker, Martinsburg, W. Va.

No Drawing. Application June 4, 1934, Serial No. 729,032. Renewed March 28, 1939

2 Claims. (Cl. 99—132)

This invention relates to the manufacture of preserves, more particularly to an improved standardized pectin containing product.

At the present time, the pectin manufacturer markets his product in the substantially pure concentrated form, either as a liquid product or in the dry powdered form. Such products are sold in bulk to the preserve manufacturer or in small packages to the household trade. The pectin concentrates are employed according to recommended recipes for making jellies, jams and the like.

The pectin utilized in such concentrates is extracted from pectin containing fruits principally the apple. The typical method of procedure comprises crushing the apples to express the juice and then treating the pulp residue or pomace to extract the pectin. This is usually done by leaching the mass with cold water to remove the water soluble substances particularly sugar. The pectin is then solubilized by utilizing a hot acidulated aqueous solution. The liquid containing the pectin in solution is then separated from the pulp and is either concentrated to form the liquid product, or it is treated with a precipitant to throw down the pectin in solid form, which latter is then separated and dried.

According to such prior methods, many valuable products are lost; substantially the only marketable products which are obtained are cider and pectin. The apple, however, contains substances which have a real dietetic value, such for example, as the fruit sugars. I have found that the fruit may be utilized to a much greater degree to produce a new product which is especially suitable for a base in jams and preserves, and one which can be employed according to standard recipes.

It is, therefore, an object of the present invention to provide an improved base for the manufacture of preserves.

Another object is to produce a fruit product which is especially adapted to the manufacture of jams and the like.

Yet another object is to prepare a fruit pulp of a standardized or fixed gel strength.

With these and other equally important objects in view, the invention comprehends the concept of preparing a fruit product containing all the essential constituents of the natural fruit which is of a standardized gel strength.

As indicated above, in the usual method of producing pectin, much of the potentially valuable parts of the fruit are wasted. This has been recognized heretofore and some suggestions have been made for utilizing the entire fruit. Thus, it has been proposed to grind and dehydrate the entire fruit and employ the resultant dry pulp as a filler or base for jams and similar conserves. While such material may be so used, it is difficult to secure any uniformity of results in the ultimate product; namely, the preserve. Thus if, as is invariably the case, there is a difference in the kind or degree of maturity of the fruit, there is a corresponding variation in the constituents, and particularly the quantity of pectin. With such a material, the production of a satisfactory jam is largely a matter of guess work or at least an empirical problem.

According to the present invention, such a disadvantage is overcome, for the material produced is rendered uniform with respect to its ability to jell.

The production of a standardized apple product, according to the invention, will be described, but it will readily be appreciated that the same principles may be utilized in preparing other specifically different fruit compounds.

In carrying out the process, fresh apples are cored and peeled and the fruit is then comminuted to reduce it to a pulp of any desired density and particle size.

A sample of the fruit pulp is then tested to determine the actual gel strength of the mass. Thereupon concentrated pectin, in either the liquid or powdered form, is added to raise the potential gel strength of the final product up to the desired value. Such a standardizing may, for example, be established on such a basis that one pound of the fruit product will produce a jam or preserve when mixed with from 1 to 5 pounds of sugar. This product, therefore, comprises a fruit pulp of fixed and known jellifying ability.

After the product has thus been standardized, it may be pasteurized and packed in sterile containers, or if desired, it may be pasteurized within the cans. In the marketing of the material in bulk, other forms of preservation may be employed, such for example, as treatment with sulphur dioxide or sodium benzoate.

When such a material is to be employed in the manufacture of a jam, sugar to the extent of from one to five pounds of sugar to one pound of the pulp is added. If desired, other fruit pulps and/or juices may be added to give a distinctive texture or flavor. The material is then cooked for a short period of time, sufficiently long to solubilize the sugar and disseminate the flavor of the added fruit.

When the improved product is used alone, an apple jam may quickly and easily be prepared, it being necessary only to add a definitely fixed quantity of sugar. When other fruit pulps are employed, a wide range of combinations are permissible. The use of the material involves no testing or trials to determine the proper quantity of sugar to be added and thus eliminates haphazard or unsuccessful trials.

The method of compounding the improved product may be modified to a considerable degree depending on raw material employed and the use to which it is to be put. Thus, if a particular jelly manufacturer so desires, because of his own plant practice or for whatever reason, a standardized acid free pulp may be prepared to his specification. In producing such a product, it is necessary only, by methods well known, to determine the acidity of a particular batch and then to neutralize or reduce the acidity to any desired degree. Conversely, when circumstances so require, the acidity of the pulp may be increased by adding fruit acids from an extraneous source so as to insure a predetermined hydrogen ion concentration in the batch at the time of making the jam.

It will be appreciated that the density of the pulp may be adjusted to any predetermined degree by controlling the amount of water contained in the mass, and if desired the pulp may be substantially dehydrated.

It will be appreciated that products made according to the present invention may comprise a mixture of two or more fruit fibers which are homogeneously admixed and standardized in the manner described. The particle size of the fibers constituting the pulp may be varied widely. If desired, the principles of the present invention may be utilized in the treatment of whole fruit that is to say the product may be made up which comprises the pared and cored apple which is packed in a liquid medium and which has been treated with added pectin so as to bring the jellifying power of a given mass of the material up to an established unit value.

The peels and cores resulting from the preliminary cleaning of the fruit may be utilized as a source of pectin. These materials may be comminuted and leached with cold water to extract the water soluble substances, and after draining may be heated in an autoclave with temperatures sufficiently high to solubilize the pectin content. The pulp residue may then be separated from the solution of pectin by typical filtration methods and the solution may be concentrated by evaporation in a typical vacuum evaporator. If powdered pectin is desired, the filtrate may be concentrated to any desired degree, and the pectin may then be thrown down by adding a precipitant such as alcohol. The precipitated pectin then may be separated from the liquor and dried.

In lieu of the pressure extraction, the cold leached peelings may be treated with an acidulated aqueous solution and heated for a sufficient period of time to solubilize the pectin after which the pectin solution may be separated and concentrated in the well known manner.

The process, therefore, provides for the complete utilization of the fruit and produces a novel product which makes an excellent base material for jams and the like. The pectin extracted from the peelings and cores largely supplies the quantity necessary for standardizing. The process, therefore, is quite complete.

While preferred modifications of the invention have been described, it is to be understood that these are given merely to exemplify the underlying principles involved and not as the exclusive means of effectuating such principles.

I claim:

1. A method of preparing bases for jams and the like which comprises removing the peel and core of apples; comminuting the peeled and cored apples to produce a batch of aqueous pulp containing the full quantity of natural sugar, acid and pectin; separately treating the cores and peelings to extract the pectin content thereof, concentrating the extracted pectin; testing the said batch of pulp to determine the jellifying characteristics and then adding to the batch a quantity of the said concentrated pectin to raise the material to a standard predetermined gel strength.

2. A method of preparing bases for jams and the like which comprises removing the peel and core of apples; comminuting the peeled and cored apples to produce a batch of aqueous pulp containing the full quantity of natural pectin, sugar and acid; testing the said pulp to determine the jellifying characteristics of the pulp; neutralizing the acid content thereof without destruction of the natural pectin; separately treating the cores and peelings to extract the pectin content thereof and concentrating the extracted pectin; and then adding the said concentrated pectin to the batch of pulp to raise the material to a standard predetermined gel strength.

WILLIAM A. ROOKER.